United States Patent [19]

Mosher et al.

[11] Patent Number: 4,657,094
[45] Date of Patent: Apr. 14, 1987

[54] FILL HEIGHT DETECTOR IN WEIGHING AND PACKAGING SYSTEM

[75] Inventors: Oren A. Mosher; Oren G. Mosher, both of Hayward, Calif.

[73] Assignee: Package Machinery Company, East Longmeadow, Mass.

[21] Appl. No.: 849,032

[22] Filed: Apr. 7, 1986

[51] Int. Cl.$^4$ .................. G01G 19/52; B65B 1/36; G01F 17/00; B67D 5/08

[52] U.S. Cl. .......................... 177/50; 177/1; 53/503; 73/149; 222/64

[58] Field of Search .............. 222/64, 65; 53/121, 53/503; 73/149; 177/1, 50

[56] References Cited

U.S. PATENT DOCUMENTS

| | | | |
|---|---|---|---|
| 3,097,459 | 7/1963 | Rausch | 53/503 |
| 3,430,814 | 3/1969 | Cymbalisty | 222/64 |
| 4,520,883 | 6/1985 | Fukuda | 177/1 |
| 4,535,627 | 8/1985 | Prost et al. | 73/149 X |
| 4,548,286 | 10/1985 | Sashiki et al. | 53/503 X |

Primary Examiner—George H. Miller, Jr.
Attorney, Agent, or Firm—McCormick, Paulding & Huber

[57] ABSTRACT

A package fill height detector comprises a probe for abutting a batch of product in a package, means for inserting the probe into an opening in the top of the package so that the probe rests on the product, and a sensor for sensing the height of the probe when it rests on the product in the package to determine the fill height of the package. The means for inserting the probe into the package comprises an arm which supports the probe, a motor for rotating the arm and a cam for guiding the arm downwardly into the package until the probe rests on the product within the package and then upwardly out of the package.

An associated weighing and packaging system includes a control coupled to the sensor for decreasing the delivered weight of subsequent batches of product when the fill height is below a target level and vice versa.

6 Claims, 7 Drawing Figures

FILL HEIGHT DETECTOR IN WEIGHING AND PACKAGING SYSTEM

BACKGROUND OF THE INVENTION

The invention relates generally to packaging systems and deals more particularly with an apparatus for detecting whether a package is filled to a proper level and also deals with a weighing and packaging system which includes the aforesaid apparatus and regulates a package target weight in a stable manner to control the product level in the package.

A variety of types of weighing machines exist today which are capable of weighing out quantities of product within a small tolerance range. However, the composite density of certain types of products may vary significantly, for example, that of cereals or other products which contain a large number of pieces per package which pieces vary in size and shape. Besides the variations in the size and shape of the pieces, the random arrangement of the pieces within a package and degree of settling also affect the composite density and resultant volume of the product.

To please consumers, it is often desirable that packages be filled nearly to the top. However, considering the variations in product density, the package size is often selected such that for a given weight of the product, the average product height is somewhat below the maximum fill height of the package. Settling may occur after a package is initially filled so that it is important that the package be initially filled as high as possible, but nevertheless with the restraint that few or none of the batches of product overflow the package.

It has previously been suggested in U.S. Pat. No. 4,520,883 to discharge each batch of product from a weighing machine into a transparent cylinder prior to discharging it to a package, and to measure the height of the product in the cylinder with photoelectric eyes to estimate the volume of the batch. If the volume is too low, then a target weight for the batch may be increased so that future batches will presumably have a higher volume, and conversely, if the volume is too high, the target weight may be decreased.

One disadvantage of this previous system is that the discharge of the product into the transparent cylinder and the requisite settling time decrease the overall packaging speed. Also, it is possible that the walls of the cylinder may be coated with dust from the product and thereby frustrate the photoelectric eyes. Moreover, the volume of the product in the cylinder may not be the same as the volume of the product in the package because of the differences in how the pieces of the product are arranged in the package compared to the arrangement in the cylinder and the varying degrees of settling.

A general object of the present invention is to provide an apparatus for detecting whether a package is filled to a proper height.

Another general object of the invention is to provide an apparatus of the foregoing type which may be included within a weighing and packaging system without decreasing the packaging rate.

A more specific object of the invention is to provide a system of the foregoing type in which the height of the product in the package when detected approximates the height of the product when the package is obtained by a consumer.

Another specific object of the present invention is to provide a weighing and packaging system including the foregoing apparatus as one component, which system includes means for adjusting a package weight to regulate fill height.

Other objects and advantages of the present invention will become apparent from the following figures and detailed description.

DETAILED DESCRIPTION OF THE PREFERRED EMBODIMENT

Figure 1:
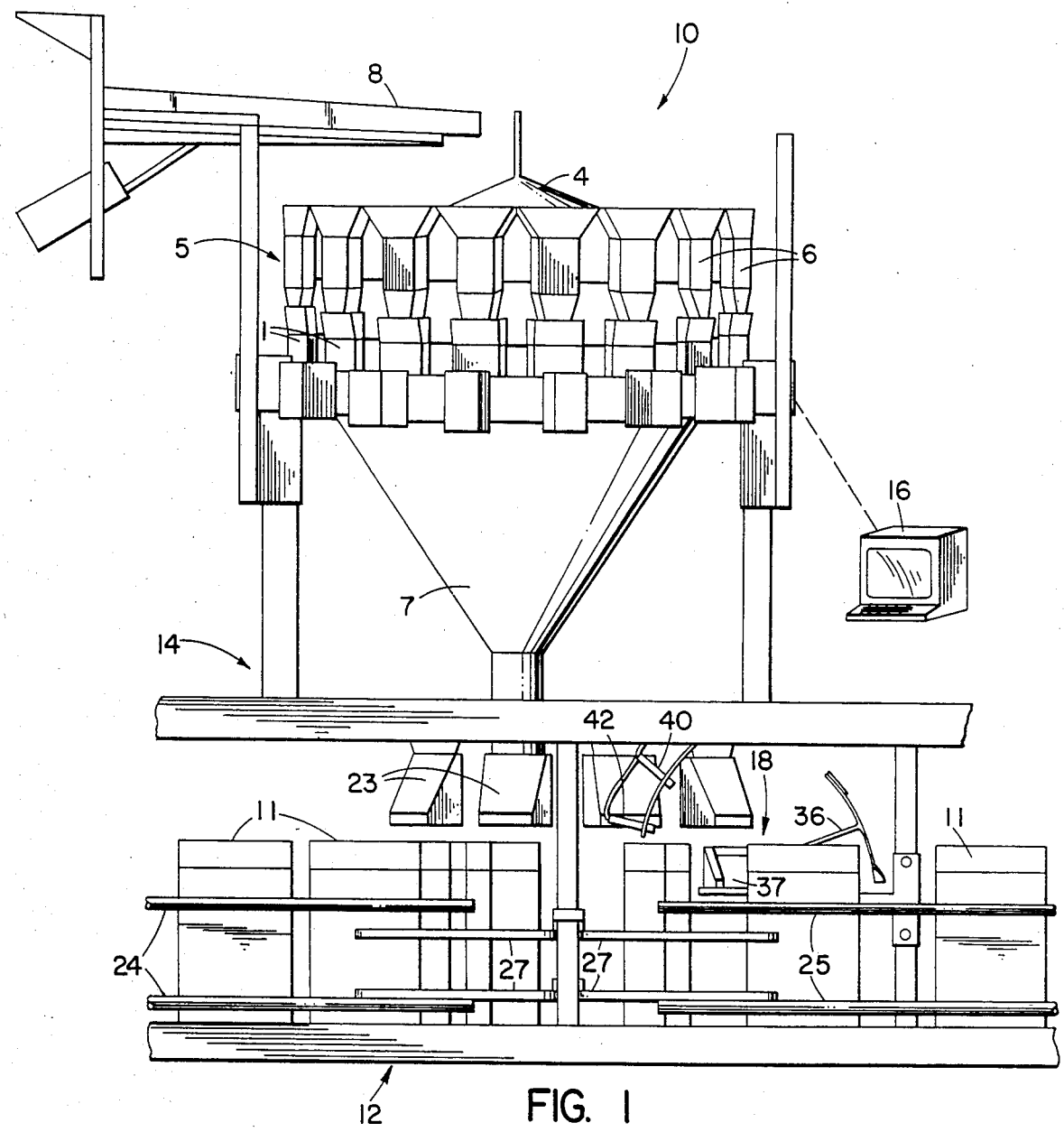
FIG. 1 is a perspective view of a weighing and packaging system in which the invention is embodied.
Figure 2:
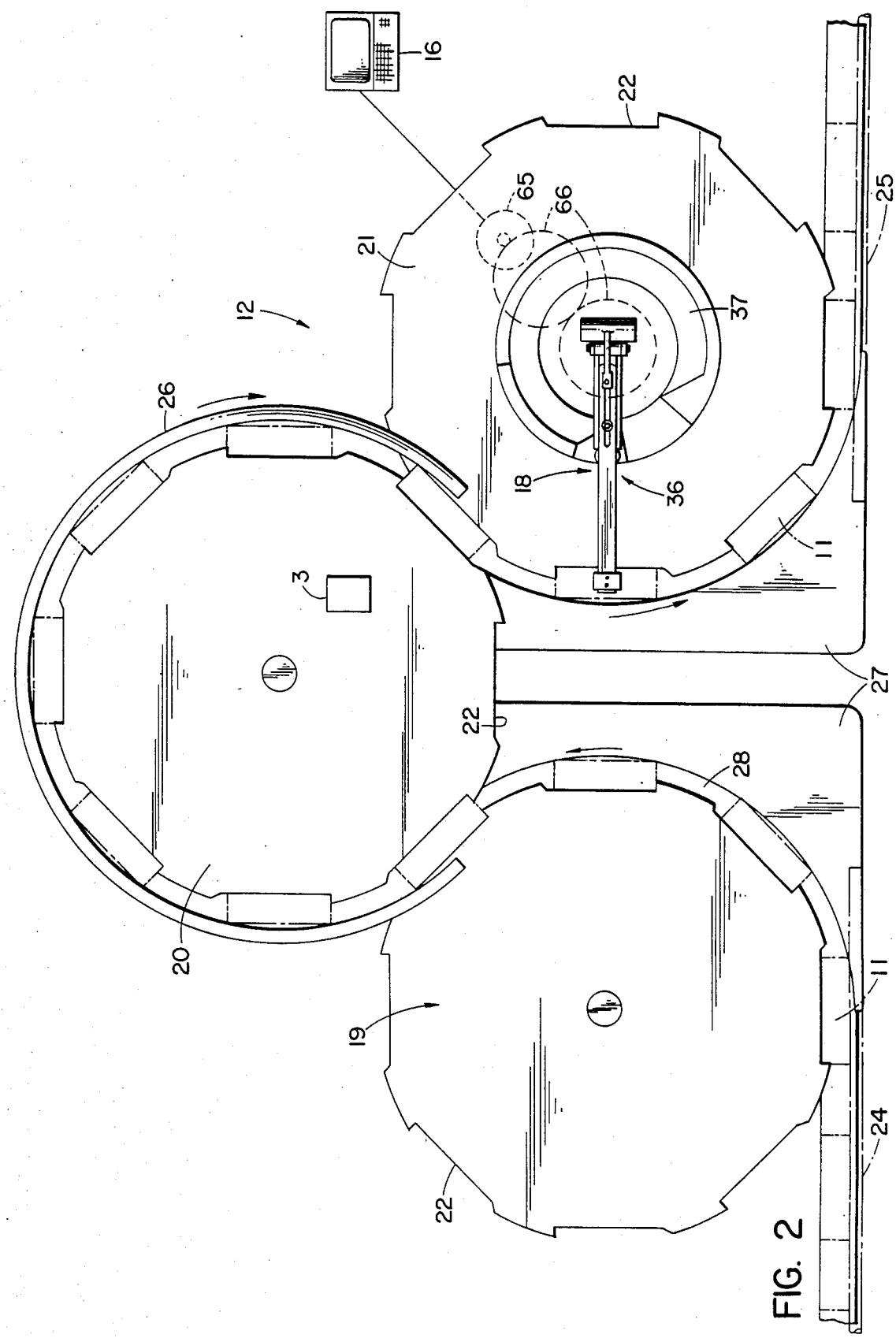
FIG. 2 is a top view of a package feed assembly within the weighing and packaging system of FIG. 1.

Turning now to the drawings, FIGS. 1 and 2 illustrate a weighing and packaging system generally designated 10 in which the invention is embodied. The system 10 comprises a package feeding assembly 12, a weighing and packaging machine 14, a computer controller 16, a fill height detector 18, and a vibrator 3 which is coupled to the feeding assembly 12.

The feeding assembly 12 comprises circular, rotatable tables 19, 20 and 21, peripheral guide bars 24, 25, 26, guide plates 27, and a flexible conveyor belt 28 which circulates first around the table 19 then around the table 20 and then around the table 21. Each of the tables 19, 20 and 21 has teeth equally spaced about its perimeter which teeth form pockets 22 for receiving packages 11,11 and moving them from table to table.

The weighing and packaging machine 14 may comprise one of various types of weighers, for example a combination weigher 5 as disclosed in U.S. Pat. No. 4,550,792 to Mosher et al, issued Nov. 5, 1985, assigned to the assignee of the present invention and hereby adopted by reference as part of the present disclosure or a noncombination weigher. The combination weigher 5 comprises weighing scales 1,1, time fill or accumulator buckets 6,6 which rapidly supply the weighing scales 1,1 with product, a vibrating product feed assembly 4 for supplying the accumulator buckets at a gradual rate with a fraction of a package target weight of the product, and an input conveyor 8 for delivering product to the feed assembly 4. The weighing scales 1,1 discharge into a common discharge chute or funnel 7 which common chute 7 fills rotary discharge chutes 23,23, one at a time, with the target weight of the product. The packages 11,11 revolve in table 20 beneath the weighing machine 5 in synchronization with the rotary discharge chutes 23,23 to receive the product.

A vibrator 3 is coupled to the table 20 and is continuously active. While the packages 11,11 are located beneath the weighing machine 14 and receive product via the chutes 23,23 the vibrations prevent the product from clogging the chutes and the tops of the packages. Also, while the packages travel around the table 20 enroute to the table 21 and the fill height detector 18, the vibrations help the product to settle in the packages and thereby obtain a level similar to that which will exist in the packages when opened by a consumer.

Figure 4:
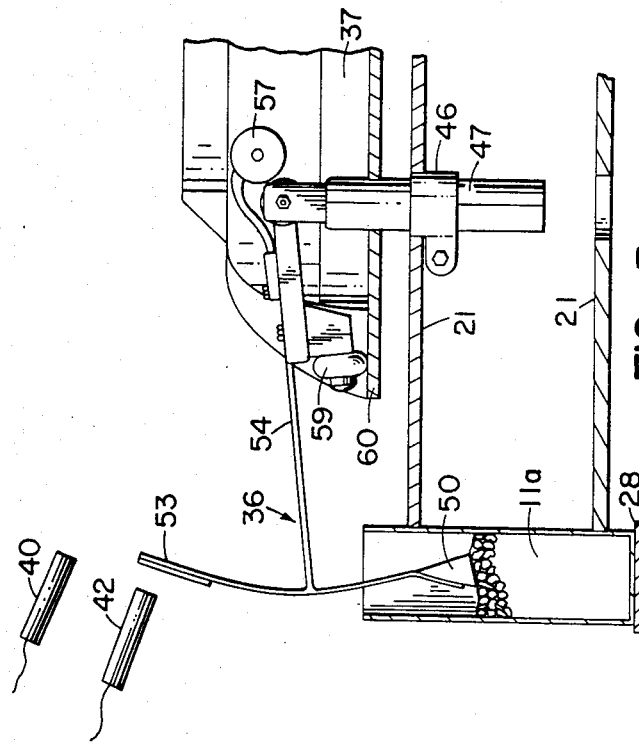
FIG. 4 is a side view of the fill height detector of FIG. 3 sampling a package which is filled to a proper level.
Figure 5:
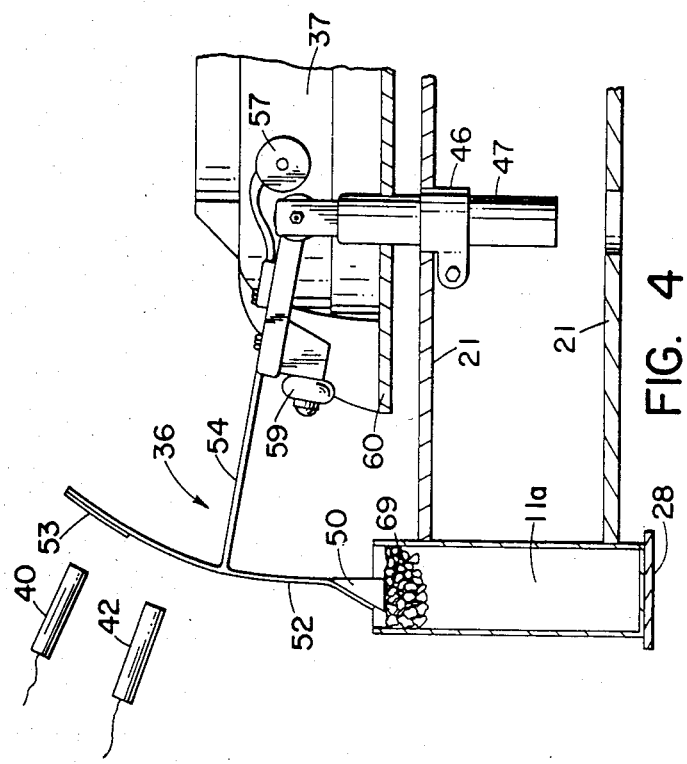
FIG. 5 is a side view of the fill height detector of FIG. 3 sampling a package which is not filled to a sufficient level.
Figure 3:
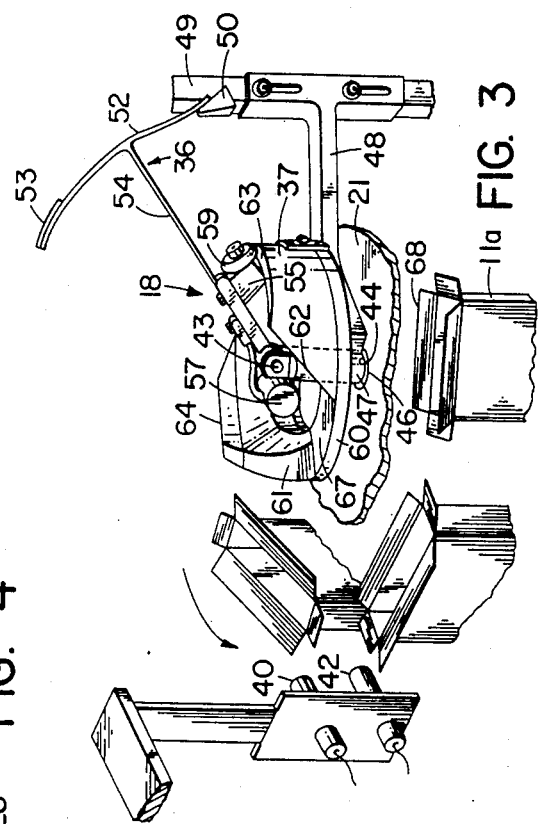
FIG. 3 is a fragmentary perspective view of the weighing and packaging system of FIG. 1 and shows a fill height detector enroute to sampling a package.

As shown in FIGS. 3-5, the fill height detector 18 comprises a probe assembly 36, a cam 37, and two sensors 40,42 which sense the position of the probe assembly 36. The table 21 may also be considered as part of the fill height detector 18. The probe assembly 36 includes a probe 50, a first vane or arm 52 which supports the probe at one end, a flag 53 fixedly attached to the other end of the arm 52 and a second vane or arm 54 which supports the arm 52. The arm 54 is pivotly mounted to a shaft 47 by a horizontal pivot pin 43, which shaft is received within an aperture 44 in the top of the table 21 and fixed to the table by a clamp 46 so that the probe assembly revolves in synchronization with the table 21. The computer controller 16 also controls a motor 65 which drives the table 21 (FIG. 2) via a gear assembly 66 and the probe assembly 36 in a counterclockwise direction in the illustrated embodiment which controller 16 also tracks the rotation of the motor and therefore, the angular position of the table 21. The cam 37 is fixedly mounted at an adjustable height by a support bracket 48 to a stationary post 49. A cam follower in the form of a wheel 49 within the probe assembly 36 is rotatably mounted to the arm 54 of the probe assemby via a bracket 55 and moves along the top edge of the cam as the table rotates.

As shown by FIGS. 3-5, the cam is formed by clyindrical side wall portions 61,62,63 and 64 and a washer-shaped base portion 60 and has a gap 67 aligned with the sensors 40 and 42. In the illustrated embodiment, the portion 63 extends approximately 150 degrees and has an approximate level upper edge upon which the wheel 59 travels. While the wheel 59 travels on the portion 63, (FIG. 4) the probe assembly is maintained at a substantially fixed elevation. Next, the wheel 59 encounters the portion 64 of the cam 37 which portion is taller than the portion 63 so that the probe assembly moves upwardly. Simultaneously, one of the packages 11a (shown at a subsequent position in FIG. 3) is transferred from a pocket in the table 20 to a pocket in the table 21 adjacent to the portion 64 of the cam so that the probe is moved upwardly over a rear cover flat 68 of the package 11. Next, the wheel 59 is guided along the portion 61 of the cam toward the gap 67, which portion 61 is inclined downwardly so that the probe 50 dips down into the package 11a. The probe 50 is lowered until either it encounters the product within the package 11a and rests on top of the product or until the wheel 59 encounters the base portion 60. In FIG. 4, the probe assembly is shown in the gap 67 with the probe 50 inserted in a package which is filled to a sufficient level so that the probe rests on the product, and in FIG. 5, the probe 50 is shown in a package which is underfilled and the probe is positioned at a lower limit, which lower limit is established by the base portion 60.

It should be noted that the weight of the probe 50, the arms 52 and 54 and the flag 53 is offset to a large degree by a counterbalance 57 so that the probe 50 contacts the product with a light force and does not penetrate into or damage the product. Also, a bottom face 69 of the probe is broad enough to distribute the contact force on the product so that the probe does not penetrate into the product and rests at a level which closely approximates the top level of the product in the package.

Figure 6:
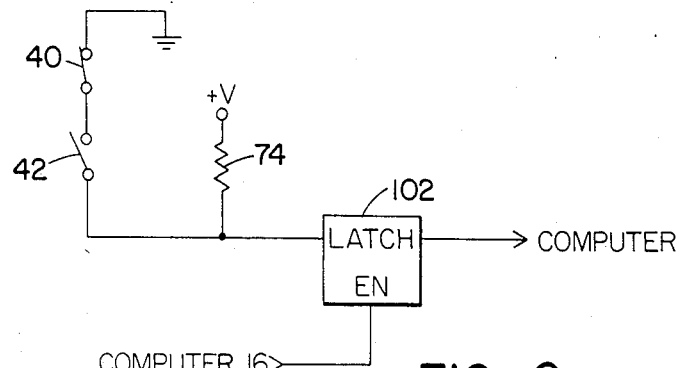
FIG. 6 is a schematic diagram of electronic circuitry within the weighing and packaging system of FIG. 1.

In the illustrated embodiment, the sensors 40 and 42 are magnetic and the arm 52 and the flag 53 are metal; however, if desired, photoelectric sensors may be substituted. As shown in FIG. 6, the sensor 40 comprises a normally closed switch which opens when either the arm 52 or the flag 53 is positioned in front of the sensor 40. The sensor 42 comprises a normally open switch which closes when either the arm 52 or the flag 53 is positioned in front of the sensor 42. Consequently, when the probe assembly is positioned midway in the gap 67, one of two conditions occurs. As shown in FIG. 5, if the height of the product in the package 11a is so low that the wheel 59 encounters the base portion 60 of the cam before the probe 50 encounters the product, the flag 53 will be positioned so that its top edge is beneath the level of the magnetic sensor 40 and above the level of the magnetic sensor 42 so that the magnetic sensor 40 exhibits its deactivated, closed position.

As shown in FIG. 6, the magnetic sensors 40 and 42 are connected in series so that in the aforesaid situation where the fill height is low, the input of a latch 72 is grounded, and set at a "one" state. On the other hand, if, as shown in FIG. 4, the package 11a is filled to a sufficiently high level so that the probe rests on top of the product before the wheel 59 engages the base portion 60 and before the top edge of the flag 53 dips below the level of the magnetic sensor 40, then the magnetic sensor 40 is activated and opened shortly before the magnetic sensor 42 is activated and closed. Consequently, a voltage will be applied through a pull-up register 74 to the input of the latch 102 and sets the latch in a "zero" state.

The state of the latch 102 is sensed at its output by the computer controller 16 so that the computer learns whether the package 11a has been filled to a sufficiently high level or not. If the probe assembly 36 breaks and does not set the latch at all in accordance with the actual fill height, the sensor 42 remains open to indicate the fill height is not low. Under these circumstances, a low fill height signal is prevented from being repeatedly sent to the computer controller 16. Thus the fill height detector is fail safe.

As the table 21 and the probe assembly 36 continue to rotate, the wheel 59 soon encounters the portion 62 of the cam 37 which portion is inclined upwardly so that the wheel 59 and the probe assembly 36 move upwardly and the probe 50 rises out of the top of the package 11a. Next, the package moves downstream along the conveyor to a subsequent site where the package may be sealed or be subject to another function. The probe assembly 36 also continues to revolve around the cam 37 and after revolving to the gap 67 again, samples the height of another one of packages 11,11 to continue to fill height detection process. In the embodiment illustrated in FIG. 2, the fill height in every eighth package is checked.

Figure 7:
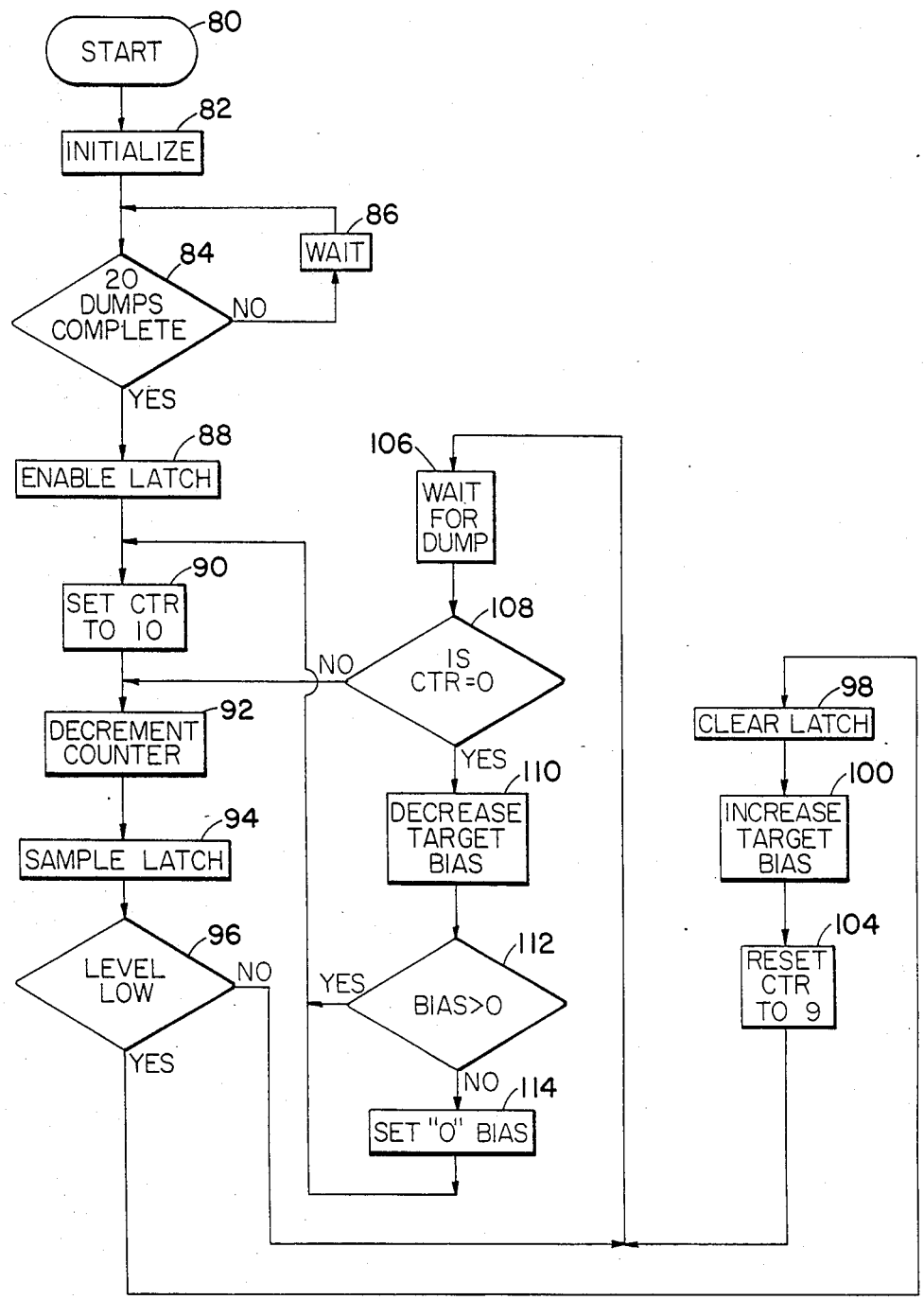
FIG. 7 is a flow chart illustrating a process for adjusting a target weight of the weighing and packaging system of FIG. 1 to control the fill height of packages.

The flow chart of FIG. 7 illustrates a method by which the computer controller 16 utilizes the fill height detection information to adjust the desired weight of product in each package and thereby control fill height.

After startup 80 or restarting of the machine and initialization 82 of the counters and controls, the computer controller 16 waits until twenty dumps have occurred before sampling of the output latch 102 and adjusting the desired package weight upwardly or downwardly. The waiting loop is entered from branch 84 and waits at instruction 86 for a dump signal during each pass through the loop. The twenty dumps allow the weighing and packaging system to stabilize and produce relatively uniform charges and heights of product in each package at the initialized parameters.

After the twenty dumps have occured, the computer controller 16 enables latch 102 at step 88 so that the conditions of sensors 40 and 42 can be monitored. An internal dump counter, which may also be used in connection with branch 84, is set at step 90 to a count of 10 and is immediately decremented to count 9 at step 92. The latch 102 is then sampled at step 94 to determine whether the fill level in a package that has been probed by the fill height detector 18 is above or below the desired level. Since the latch 102 was enabled only a brief instant before, it is unlikely that a package will have been probed by the detector 18, and therefore, the latch is set at the unlatched or "zero" state indicating that the level is not low and no adjustment is required. The computer controller than follows the program loop from branch 96 through step 106 and branch 108 to decrement the counter with each dump cycle until finally a package is probed by the detector 18.

If the fill level detected at branch 96 is low, the computer enters the loop for incrementally increasing the fill height. From branch 96, the program clears the latch at step 98, and increases a target bias weight by a predetermined amount at step 100. The target bias weight is that incremental weight that is added to the target weight and causes the combination weighing system to search for and dump charges of product which are larger than the target weight by the amount of the bias weight. Thus, the packages which are filled by the weighing machine after an incrementally upward adjustment is made have slightly greater volumes and weights of product and correspondingly greater fill heights in the package.

From step 100, the program advances and resets the dump counter to a 9-count at step 104. Thereafter, the program proceeds to instruction 106 and waits for a dump signal. The counter is then interrogated at branch 108 to determine if the counter has been decremented to a zero count, and obviously on the first pass through the branch 108 from step 104 the count will be 9 so the program proceeds to decrement the counter in the main loop at step 92. Again, the latch 102 is sampled, but since the fill height detector does not probe the next seven packages, the latch remains in the unlatched or "zero" state indicating the level is not low. The loop through step 106 and branch 108 to decrement the counter is thus followed for nine dumps, or until the fill height detector 18 senses a low fill height in the eighth package and set the latch 108 in the "one" state to increase the target bias weight as described above.

If the fill height stabilizes at or above the desired level for nine dumps, the program advances from branch 108 to step 110 where the target weight bias is automatically decreased by an incremental amount. The decrease in bias weight prevents the fill height and weight of delivered product from growing uncontrollably large for any reason such as a decrease in product density or a malfunction of the detector 18.

To ensure that step 110 does not decrease the bias weight below zero and thus reduce the package weight below the target weight, the progam advances from step 110 to branch 112 and tests the new bias weight value. If the bias weight is greater than zero, the weighing machine is advised, and the program advances directly to steps 90 and 92. These steps put the counter at 9-count to allow at least eight more packages to pass before the fill height detector 18 again sets the latch 102. If the decrease at step 110 caused the bias weight to drop below zero, the program advances the step 114 and sets the bias weight to a zero value and then advances to step 90. Thus, in no event, will the target bias weight be reduced below zero, and the delivered package weight will not drop below the target weight.

Accordingly, the program illustrated in FIG. 7 is designed to control the fill level about a desired fill height established by the position of the sensors 40 and 42 and includes the step 110 for decreasing the target bias as well as the step 100 for increasing the target bias weight in what is effectively close loop control. The program can also favor increases of the bias weight, so that the bias is increased more rapidly than it is decreased. This feature encourages the fill heights to be rapidly returned to the desired level if the detected level is low and is implemented, for example, simply by doubling the count set at step 90.

From the foregoing, a weighing and packaging system including a fill-height detector has been disclosed. However, numerous modifications and substitutes may be made without deviating from the scope of the invention. For example, it is possible to utilize only the one sensor 40 to detect the height of product in a package under certain conditions. Also if desired, a sensor or sensors located adjacent to the pin 43 may be utilized to detect the angular displacement of the arm 54 instead of the sensors 40 and 42. If desired, the portion 63 of the cam 37 may be inclined gradually upwardly from the top of the inclined portion 62 to the top of the portion 64. Also, another vibrator may be coupled to the table 21 to facilitate settling of the product. Therefore, the invention has been disclosed by way of illustration and not limitation.

We claim:

1. A weighing and packaging system comprising:
   means for supporting an empty package in an upright position,
   weighing and packaging means for weighing out a quantity of said product at a package weight near a target weight and discharging said quantity of product into said package,
   probe means for abutting the product in said package at the product fill level,
   insertion means for inserting said probe means into said package through an opening at the top until said probe means rests on said product at the fill level,
   means for sensing the position of said probe means while said probe means rests on said product in said package to detect whether said package is filled to a predetermined level, and
   control means connected to the sensor means for increasing the package weight above said target weight when said sensor means indicates that said package is filled to a level less than said predetermined level.

2. A weighing and packaging system as set forth in claim 1 further comprising:
   vibrator means for vibrating said package after it receives said quantity of product to facilitate settling of said product.

3. A weighing and packaging system as set forth in claim 1 wherein said control means includes means for higher said package weight when said sensor means indicates that packages whose fill height has been detected by said probe means, insertion means and sensor means have fill heights higher than said predetermined level.

4. A weighing and packaging system as set forth in claim 1 further comprising
   means for conveying said package from said weighing and packaging means along a path to a subsequent work station, and wherein
   said means for inserting said probe means is located along said path and includes means for moving said probe means along a portion of the path to track said package as said package is conveyed and simultaneously inserting said probe means into said package so that the conveyance of said package is not interrupted enroute to said subsequent work station.

5. A method for detecting the fill height of a product in packages, which packages are filled serially by a weighing machine and which packages each contain a multiplicity of articles and are open at the top, said method comprising the steps of:
   supporting a probe with a support for vertical movement,
   lowering said probe into said package through the top opening until said probe either rests on said product at the fill level or said support is limited in its downward movement by a stop, whichever comes first, and
   detecting the level of said probe while said probe rests on said product at the fill level or is limited by said stop, whichever came first.

6. A method for detecting as defined in claim 5 including the further step of adjusting the weight of product dumped by the weighing machine into subsequent packages in response to the detected level in previous packages to maintain a desired fill level.

* * * * *